United States Patent
Voiculescu (12) 
(10) Patent No.: US 6,524,041 B1
(45) Date of Patent: Feb. 25, 2003

(54) LOCKING RATCHET FOR A LASHING MECHANISM

(76) Inventor: Danut Voiculescu, 5981 Fitch Rd., North Olmsted, OH (US) 44070

( * ) Notice: Subject to any disclaimer, the term of this patent is extended or adjusted under 35 U.S.C. 154(b) by 0 days.

(21) Appl. No.: 09/713,055

(22) Filed: Nov. 16, 2000

(51) Int. Cl.$^7$ .................................................. B60P 7/08
(52) U.S. Cl. ........................ 410/100; 410/12; 410/97; 410/103; 410/4; 410/106
(58) Field of Search ............................. 410/12, 96, 97, 410/100, 103, 2, 3, 4, 7, 106, 110; 24/71 ST, 71 CT, 68 CD, 68 R; 254/223, 364, 369, 376, 218

(56) References Cited

U.S. PATENT DOCUMENTS

| | | | |
|---|---|---|---|
| 2,442,266 A | * 5/1948 | Davis | 410/96 |
| 4,227,286 A | * 10/1980 | Holmberg | 410/103 X |
| 4,268,012 A | 5/1981 | Ruehle et al. | |
| 4,324,022 A | * 4/1982 | Prete, Jr. | 24/68 CD |
| 4,542,883 A | * 9/1985 | Rutzki | 254/217 |
| 4,913,608 A | * 4/1990 | Royball | 410/103 |
| 5,103,536 A | 4/1992 | Kämper | |
| 5,205,020 A | 4/1993 | Kämper | |
| 5,271,606 A | 12/1993 | Kämper | |
| 5,282,706 A | * 2/1994 | Anthony et al. | 410/100 |
| 5,369,848 A | 12/1994 | Huang | |
| 5,426,826 A | 6/1995 | Takimoto | |
| 5,476,349 A | * 12/1995 | Okland | 410/106 |
| 5,494,387 A | * 2/1996 | Ruegg | 410/103 |
| 5,542,798 A | * 8/1996 | Rawdon et al. | 410/100 |
| 5,904,341 A | 5/1999 | Norrby | |
| 6,036,417 A | * 3/2000 | Weaver | 410/7 |
| 6,044,669 A | 4/2000 | Levi | |
| 6,231,285 B1 | * 5/2001 | Elwell et al. | 410/107 |

* cited by examiner

*Primary Examiner*—Stephen T. Gordon (57) ABSTRACT

A tie-down assembly for securing an article by a strap has a frame to which one end of the strap is immovably connected and a winding shaft about which the other end of the strap is wound and unwound. A handle pivoted to the frame engages ratchet teeth on the winding shaft to rotate the winding shaft in a strap take-up direction when the handle moves from a second to a first position while not rotating the winding shaft when the handle moves the first toward the second position. A lock mechanism actuated by a key is provided to positively and selectively lock the handle to the frame when the handle is in the second position.

11 Claims, 5 Drawing Sheets

LOCKING RATCHET FOR A LASHING MECHANISM

This invention relates generally to a tensioning apparatus for a lashing strap, and more particularly to a lock for the tensioning apparatus.

The invention is particularly applicable to and will be described with specific reference to a tensioning apparatus which employs ratcheting mechanisms for tensioning and releasing the lashing strap. However, those skilled in the art will recognize that the invention may have broader applications and could be utilized in tensioning apparatuses that utilize crank mechanisms other than ratchets.

INCORPORATION BY REFERENCE

The following patents listed below are incorporated herein by reference and made a part hereof so that details related to the ratcheting mechanisms illustrated therein need not be repeated in detail in this patent:

1. U.S. Pat. No. 5,426,826 to Takimoto, issued Jun. 27, 1995, and entitled RATCHET BUCKLE ASSEMBLY;
2. U.S. Pat. No. 5,282,706 to Anthony, et al., issued Feb. 1, 1994, and entitled RETRACTABLE TIE-DOWN ASSEMBLY; and,
3. U.S. Pat. No. 5,271,606 to Kamper, issued Dec. 21, 1993, and entitled TENSIONING RATCHET FOR A LASHING STRAP.

The materials incorporated by reference, while included in this invention herein, do not, per se, form the present invention.

BACKGROUND OF THE INVENTION

It is well known that in order to transport goods, equipment, and vehicles, it is necessary to secure these items with a plurality of tie-down straps. The number of tie-down straps required generally depends on the size and type of goods to be hauled by the vehicle.

In prior art tie-down assemblies, each tie-down strap usually has a hook at each end and some mechanism for adjusting the length of the strap that is disposed between the two ends. The adjusting mechanism is often a ratchet tightening device disposed between the ends of the strap. Conventional tie-down apparatuses generally include a tensioning apparatus of the type that includes a U-shaped frame having side walls with a rotatable spindle bridging the space between the side walls. One end of the lashing strap is fixed to the frame and the other lashing strap end is threaded onto the spindle. A tensioning handle with a pawl is pivotally mounted to the frame, and cooperates with a ratchet wheel affixed to the spindle. Movement of the handle in one direction results in incremental angular movement of the spindle by engagement of the handle pawl with ratchet wheel. A spring bias arrangement is provided for release of handle pawl engagement with the ratchet wheel. Such tensioning apparatuses serve as tensioning and tie-down devices for actual straps, with lashing straps constituting the preferred embodiment of the tensioning and tie-down means, which may also be in the form of steel cables. With lashing straps, goods to be transported are secured with the necessary lashing tension to retain their position on transporting means, for example, the beds of trucks or the rooftops of automobiles.

Typical operation of a tie-down assembly includes encircling the load to be secured, pulling the loose end of the lashing strap through a slot within the spindle as far as this is possible without resistance. Then the spindle is rotated by pivoting a tensioning handle back and forth. The tensioning handle drives an externally-toothed ratchet wheel of the ratchet device in the tensioning direction of the spindle (or winding shaft), so that the lashing strap is wound around the winding shaft which acts in the manner of a wind-up reel and is thus charged with an increasing lashing tension.

One of the drawbacks of the prior art tie-down assembly straps is the fact that the ratchet mechanism does not secure the handle to the frame. The result is that one or more of the tie-down straps could be unintentionally released or the tension otherwise sufficiently reduced such that the goods that were once secured may be released from the trailer or rooftop of an automobile.

The prior art has, however, recognized that the lashing strap must be locked to maintain strap tension, and discloses a tie-down assembly that includes a locking mechanism mounted to the frame tensioning apparatus such as shown in U.S. Pat. No. 5,282,706. The locking arrangement described in the prior art represents a second spring actuated member engaged with the ratcheting spindle to allow the spindle to rotate only in a take-up direction unless the spring bias is disabled. The spring actuated member that engages the ratcheting spindle in the prior art is subject to wear and vibration on a moving vehicle and conceivably, the spring force exerted on the member will eventually be insufficient to retain the ratcheting spool in a fixed position. This could result in undesirable slack in the tensioning strap. More importantly, the spring actuated member that engages the spindle does not positively lock the handle to the frame, and cannot prevent intentional release of the ratchet spool by an unauthorized person desiring to remove the secured goods (i.e. theft).

As previously discussed, the major drawback of the existing tensioning apparatuses is that in the final load securing stage, the tensioning handle remains unsecured. The lack of a positive securement mechanism for the tensioning handle enables inadvertent, accidental, and intentional or unintentional dislodgement. Dislodgement of the tensioning handle may result in releasing the tension of the lashing strap, thereby allowing the goods that are being transported to be released from the transport vehicle. Due to the fact that the lashing straps are typically used for securing goods on a moving vehicle, releasing of these goods from the vehicle may result in catastrophic accidents to vehicles and passengers following behind the subject vehicle. A principal drawback of the prior art device is that the tensioning apparatus with an unsecured tensioning handle allows unwanted tampering with the lashing strap and also allows potential theft of the secured goods.

SUMMARY OF THE INVENTION

It is therefore one of the major objects of the invention to provide a safe and lockable tensioning apparatus.

This object, along with other features of the invention, is achieved in a tie-down assembly for securing an article by a strap which includes a frame and a winding shaft journaled for rotation in the frame in a first payout direction and in an opposite second take-up direction whereby the length of the strap is shortened by being wound around the winding shaft in the take-up direction, and lengthened by being unwound from the winding shaft in a payout direction. The assembly additionally includes a ratchet wheel having ratchet teeth rotatable with the winding shaft, a handle associated with the winding shaft and movable from a second to a first position for rotating the winding shaft an incremental angle in the take-up direction while not rotating the winding shaft when moved from the first to the second position. The assembly further includes a spring biased handle pawl for engaging the ratchet teeth to allow rotation of the winding shaft by the handle in the take-up direction and prevent rotation in the payout direction. The spring biased handle pawl is capable of being moved out of engagement with the ratchet wheel to allow strap payout. In accordance with the invention, a key operated latch mechanism is provided for selectively locking the handle to the frame in the second position to, among other things, prevent theft of the goods secured by the tie-down assembly.

In accordance with another aspect of the invention, the key operated latch mechanism includes the handle center portion having a lock opening therein and a female latch member is connected to and straddles the frame side walls. The female latch member has a configured latch opening aligned with the lock opening when the handle is in the second position and a lock tumbler connected to said lock housing passes through the lock opening. A simple and effective lock is achieved by a rotatable male latch member attached to the base of the lock tumbler and configured to pass through the latch opening when the lock tumbler is in an unlocked condition and the handle is in the second position. In addition, the rotatable male latch member is unable to pass through the latch opening when the lock tumbler is in a locked condition.

In accordance with yet another aspect of the invention, the key operated latch mechanism includes the handle center portion having a lock opening therein and a female latch member having a top portion is connected to the frame. The female latch member is aligned with said lock opening so that the top portion of the female latch member extends through said lock opening when the handle is in the second position. Importantly, the top portion of the female latch member has a latch opening therethrough so that any conventional locking bolt adapted to extend through said latch opening can be provided for preventing movement of the handle relative to the frame.

In accordance with a more specific aspect of the invention, the locking bolt can simply be the U-shaped member of a conventional padlock.

In accordance with a still general aspect of the invention, a retractable tie-down assembly for securing an article by a strap is provided, which includes a frame to which one end of the strap is immovably secured. The assembly includes a winding shaft journaled for rotation in the frame and about which the strap is wound when the winding shaft is rotated in a take-up direction and unwound when the winding shaft is rotated in a payout direction. The tie-down assembly includes a handle pivotally mounted to and manually rotatable relative to the frame between first and second positions and an engagement mechanism for rotating the winding shaft in the retracting direction when the handle is moved from the second toward the first position while not rotating the winding shaft when the handle moves from the first toward the second position. A locking mechanism actuated by a key positively locks the handle to the frame when the handle is in the second position, whereby the lock is effective to lock the tie-down assembly irrespective of the particular type of engagement mechanism used in the tie-down assembly.

It is thus an object of the invention to provide a lockable tensioning apparatus.

It is another object of the invention to provide a safe tensioning apparatus.

Yet another object of the invention is to provide an economic, rugged and reliable locking mechanism for a tie-down ratchet assembly.

Still another object of the invention is to provide an inexpensive locking mechanism for a tensioning apparatus of the type described herein.

Still another object of the invention is to provide a lock mechanism which can be easily implemented or incorporated into existing tensioning apparatus.

These and other objects, features and advantages of the present invention will become apparent to those skilled in the art upon reading the detailed description of the invention as set forth below, taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE INVENTION

Figure 1:
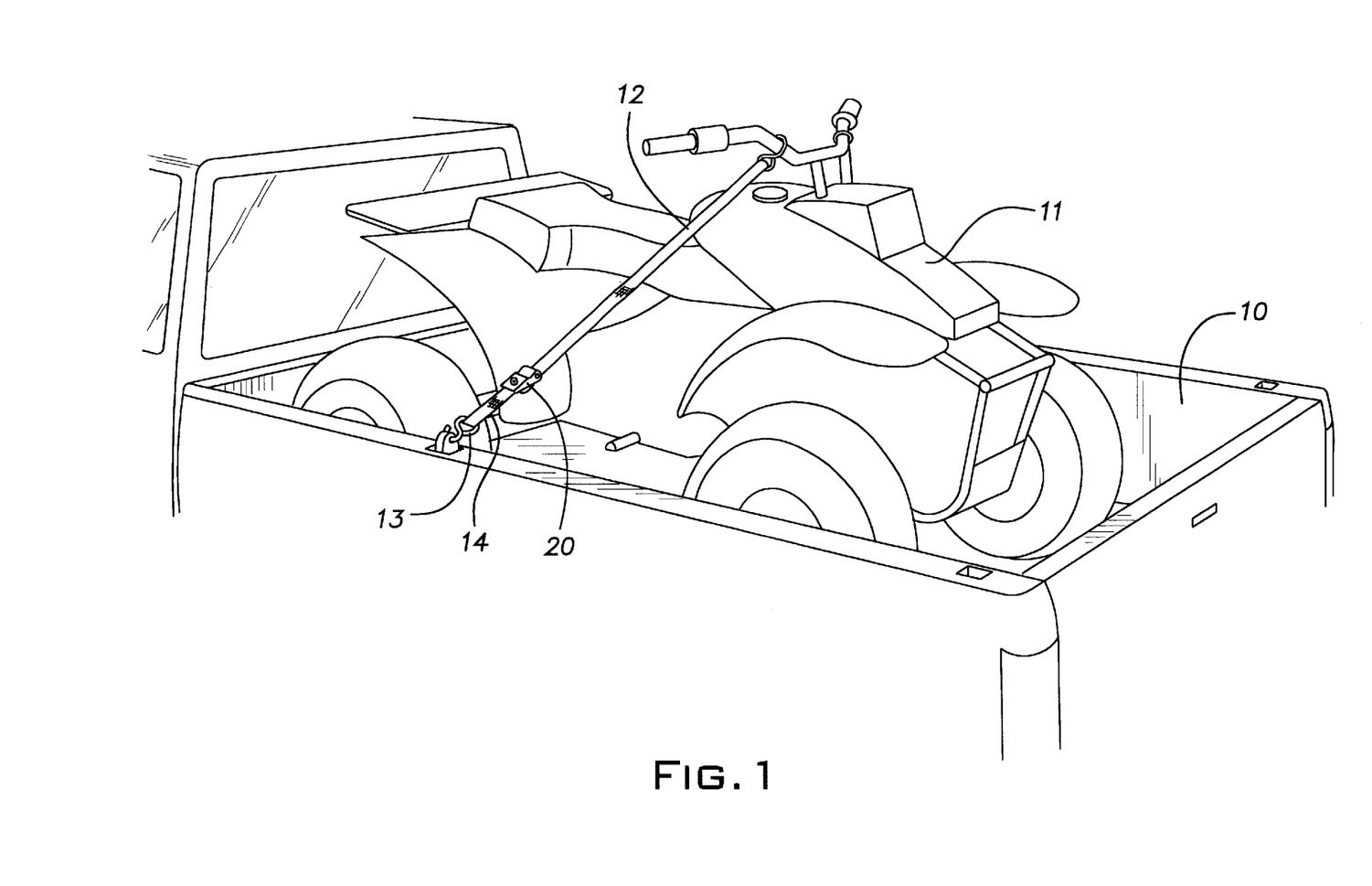
FIG. 1 is a perspective view of a pickup truck, all-terrain vehicle, and the tie-down assembly according to one embodiment of the present invention.

Referring now in detail to the drawings, wherein the showings are for the purpose of illustrating a preferred embodiment of the invention only and not for the purpose of limiting the invention, FIG. 1 illustrates a typical cargo area 10 for a pickup truck, which contains a secured all-terrain vehicle (ATV) 11. ATV 11 is secured by lashing straps 12, 14 connected at one of their ends to a locking ratchet assembly 20. Lashing strap 12 is a variable length lashing strap and lashing strap 14 is a fixed length lashing strap. At the opposite end of each lashing strap 12, 14 is permanently affixed a securement hook 13. Securement hooks 13 are used for attachment to cargo area 10 and the equipment to be secured i.e. ATV 11. Locking ratchet assembly 20 (to be described below) supplies the necessary means for tightening variable length lashing strap 12 whereby a securing force is applied to securement hooks 13 of both lashing straps 12, 14 and ultimately enables securement of the equipment. The application displayed in FIG. 1 is only an example of the many possible applications of the invention. Alternatively, variable and fixed length lashing straps 12, 14 could be replaced by a single lashing strap with ends connected to locking ratchet assembly 20. The single lashing strap circumscribes an object to be secured and a stationary support against which the object is to be secured. Locking ratchet assembly 20, when actuated, reduces the length of the encircling lashing strap until the object is firmly bound to the stationary support. As used herein and in the claims, "strap" means either two separate straps 12, 14 as shown in FIG. 1, or one unitary strap as described. For definitional purposes, then, the "strap" shown in FIG. 1 is a lashing strap having a fixed, non-changing length section 14 and a variable length changing section 12.

Figure 2:
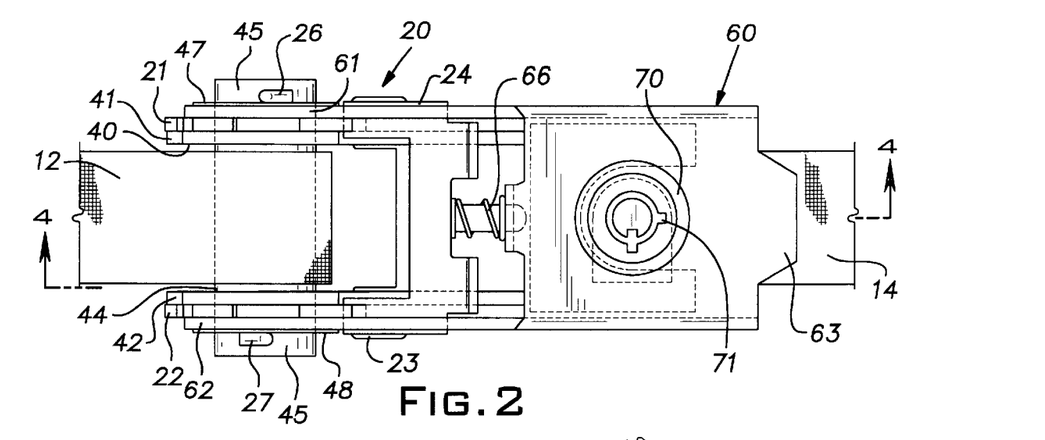
FIG. 2 is a top elevational view of the tie-down assembly in the closed position.

FIG. 2 details locking ratchet assembly 20 in the second position. Locking ratchet assembly 20 for tightening lashing straps 12, 14 is constructed of the following components. Locking ratchet assembly 20 has a U-shaped frame 40 comprised of a pair of parallel extending frame side walls 41, 42 and a frame center portion 43 interposed therebetween. Locking ratchet assembly 20 further includes a winding shaft 44 constructed of a pair of semicircular winding shaft plates 45, 46 with winding shaft 44 being supported between and extending through circular openings 52 in frame side walls 41, 42. Locking ratchet assembly 20 also includes a U-shaped tensioning handle 60 constructed of a pair of parallel extending handle side walls 61, 62 having a grip plate 63 and a handle center portion 68 interposed therebetween. Locking ratchet assembly 20 further comprises a pair of ratchet wheels 21, 22 mounted on winding shaft 44. Additionally, locking ratchet assembly 20 includes a frame pawl 23 for engaging ratchet teeth 28 during rotation. And, locking ratchet assembly 20 has a handle pawl 24 for rotatably driving ratchet wheels 21, 22 so that variable length lashing strap section 12 is wound on winding shaft 44.

In locking ratchet assembly 20 of the invention, frame 40, tensioning handle 60, and winding shaft 44 are rotatable independently of each other. Ratchet wheels 21, 22 are fixedly mounted on winding shaft 44 so as to be rotatable together with winding shaft 44. Frame pawl 23 is slidably mounted in a pair of frame longitudinal slots 53, 54 formed in frame side walls 41, 42 and is abutted against ratchet teeth 28 under the influence of a force exerted by a frame spring 25. Handle pawl 24 is slidably mounted in a pair of handle longitudinal slots 64, 65 and is engaged with ratchet teeth 28 to rotatably drive winding shaft 44 so that variable length lashing strap 12 is wound on winding shaft 44 as winding shaft 44 rotates. Handle pawl 24 is abutted against ratchet teeth 28 under the influence of a force exerted by a handle spring 66. Frame pawl 23 is engaged with ratchet teeth 28 to prevent winding shaft 44 from being reversely rotated. Additionally, semicircular winding shaft plates 45, 46 are supported by a circular opening 69 in handle side walls 61, 62 and circular opening 52 in frame side walls 41, 42, and are connected to winding shaft washers 47, 48 and pins 26, 27. Semicircular winding shaft plates 45, 46 extend through corresponding semicircular openings 55 in winding shaft washers 47, 48. Pins 26, 27 extend through holes 56 in semicircular winding shaft plates 45, 46 to allow rotation and to prevent axial movement of semicircular winding shaft plates 45, 46. The front elevational view of FIG. 2 also displays a lock housing 70 and a key slot 71. Locking ratchet assembly 20 in the closed position prevents variable length lashing strap section 12 from release. Fixed length lashing strap section 14 is rigidly affixed to flame 40 by a lashing bar 49 extending through corresponding circular openings 51 in frame side walls 41, 42.

Figure 3:
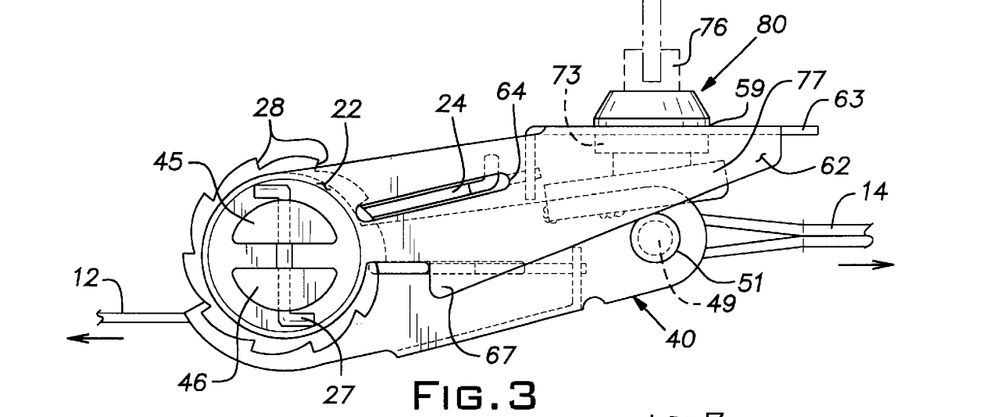
FIG. 3 is a side view of the tie-down assembly in the second position.
Figure 4:
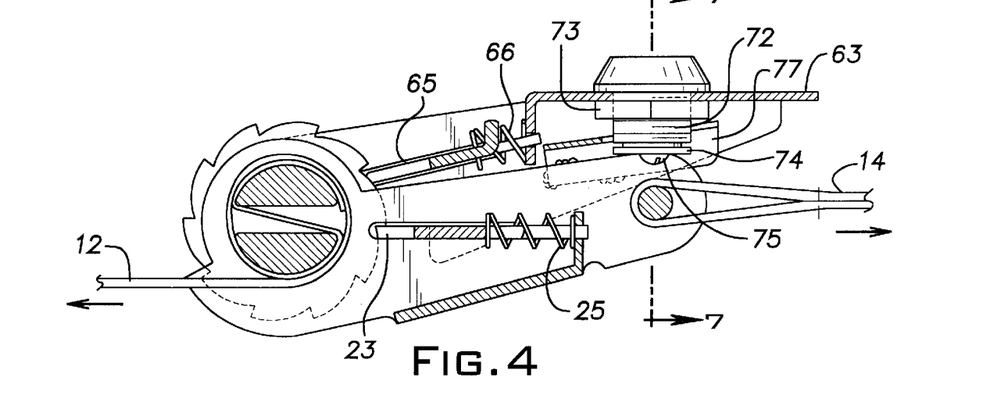
FIG. 4 is a side sectional view identical to FIG. 3 except showing both ratchet wheel engagement mechanisms.

Referring now to FIGS. 3 and 4, locking ratchet assembly 20 is shown from the side view in the second position. Fixed length lashing strap section 14 is attached to lashing bar 49. In the second position, notch 67 in handle side wall 62 engages frame pawl 23 with ratchet teeth 28 so that winding shaft 44 is prevented from being reversely rotated. As can be seen in FIG. 4, frame spring 25 and handle spring 66 exert the requisite force on frame pawl 23 and handle pawl 24, respectively. The biasing forces exerted by frame spring 25 and handle spring 66 are necessary for the proper functioning of locking ratchet assembly 20. The force exerted by frame spring 25 and handle spring 66 will diminish over time through normal use and exposure to the elements.

An operator of locking ratchet assembly 20, in order to tighten variable length lashing strap section 12, will grasp grip plate 63, which is part of the handle center portion 68, and exert an upward force thereby engaging ratchet wheels 21, 22 with handle pawl 24. As the upward force on grip plate 63 continues, ratchet wheels 21, 22 turn along with winding shaft 44 so that variable length lashing strap section 12 is wound on winding shaft 44. Upon completing one stroke of tensioning handle 60, tensioning handle 60 is returned to the starting (second) position. During the return motion of tensioning handle 60 to the second position, tensioning handle 60 moves independently from frame 40, winding shaft 44, and ratchet wheels 21, 22. This independent movement of tensioning handle 60 allows variable length lashing strap section 12 to remain fixed. Tensioning handle 60 is repeatedly moved from the second to the first and back to the second position until the desired tension has been placed on lashing strap sections 12, 14. Tensioning handle 60 is then returned to the second position in which handle pawl 24 and frame pawl 23 are engaged with ratchet teeth 28. As stated previously, notch 67 in handle side wall 62 engages frame pawl 23 and provides one means for preventing the disengagement of frame pawl 23 with ratchet wheels 21, 22.

The apparatus as described thus far is conventional and well known in the field.

A key operated latch mechanism designated generally by reference numeral 80 is connected to and passes through a lock opening 59 in handle center portion 68. Latch mechanism 80 includes a lock tumbler 72 passing through lock opening 59 and secured to tensioning handle 60 by means of a hex nut 73. A male latch member 74 is connected to lock tumbler 72 by a lock screw 75. When a key 76 is turned in a key slot 71 in lock tumbler 72, male latch member 74 is rotated about the longitudinal axis of lock tumbler 72. The rotation of male latch member 74 allows engagement and disengagement from a female latch member 77 having a latch opening 81. Latch opening 81 in female latch member 77 allows passage therethrough of male latch member 74 when key 76 places lock tumbler 72 in an unlocked condition. Subsequent rotation of male latch member 74 by key 76 causes engagement with an underside 82 of female latch member 77 preventing withdrawal through latch opening 81. Thus, in the engaged position, key operated latch mechanism 80 prevents the withdrawal of male latch member 74 from female latch member 77, and secures tensioning handle 60 to frame 40 to prevent rotation of ratchet wheels 21, 22, which ultimately prevents movement of lashing strap sections 12, 14.

Figure 5:
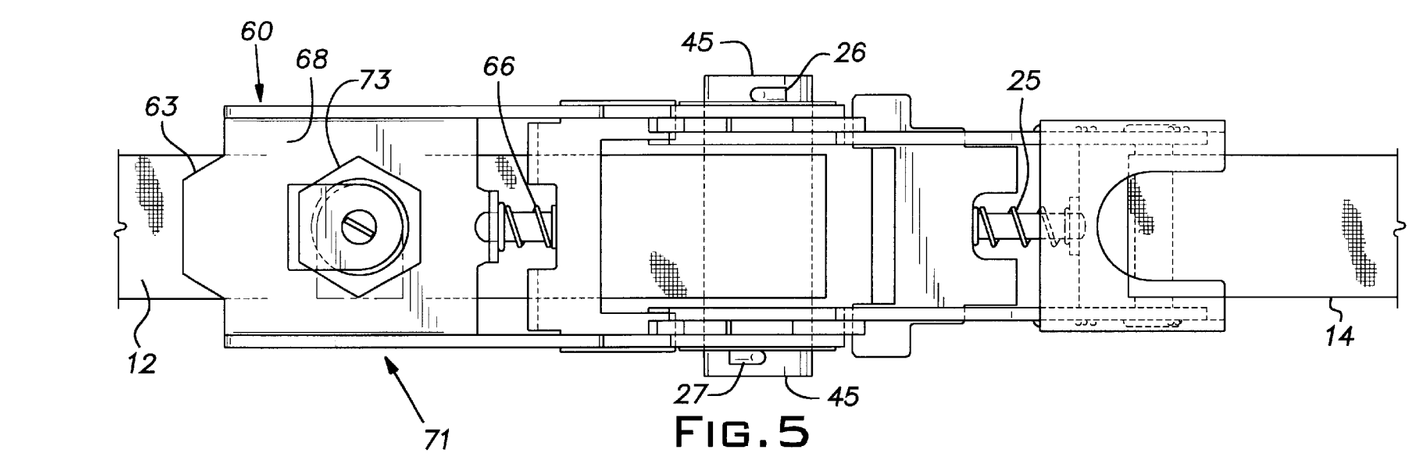
FIG. 5 is a top elevational view of the tie-down assembly in the first position.
Figures 6, 7:
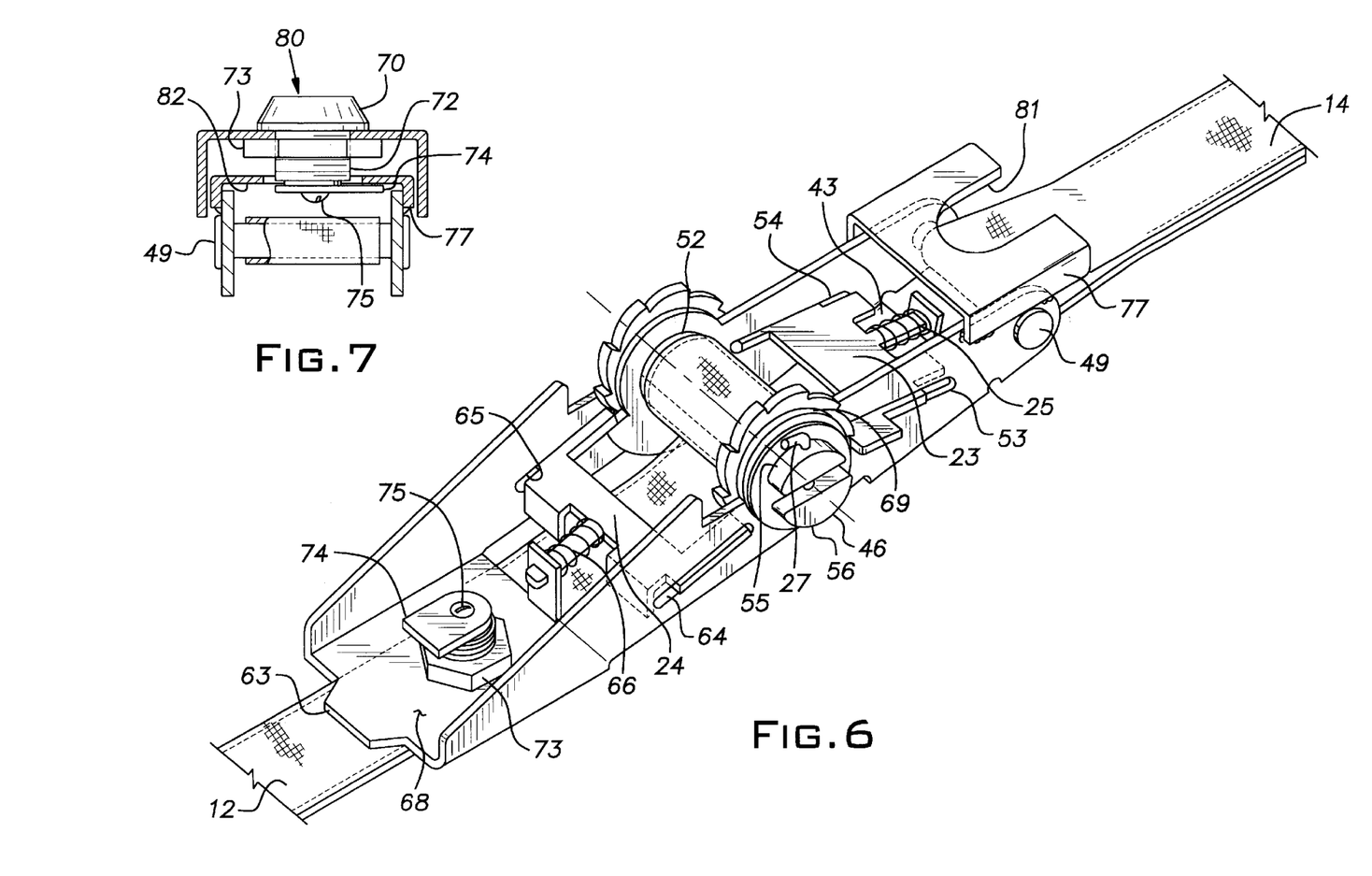
FIG. 6 is a bottom perspective view of the tie-down assembly in the first position.
FIG. 7 is a front sectional view of the tie-down assembly in the second position.

Referring now to FIGS. 5 and 6, there is shown a bottom view of key operated latch mechanism 80 in its first or unlocked position. Latch mechanism 80, specifically male and female latch members 74, 77, respectively, is displayed. Note that male latch member 74 can be withdrawn from latch opening 81. Additionally, handle pawl 24 along with its handle spring 66 and frame pawl 23 along with its frame spring 25 are readily apparent. Most of the components of key operated latch mechanism 80 are preferably made from heavy gauge hardened steel, or other suitable materials which are well-known in the art.

Referring now to FIG. 7, key operated latch mechanism 80 is shown from a front sectional view in its second or locked position. As shown, male latch member 74 is rotated on underside 82 of female latch member 77, thereby preventing withdrawal of male latch member 74 through latch opening 81 and thus, preventing operation of the tensioning apparatus, either to unlock locking ratchet assembly 20 or to alter the tension on lashing strap sections 12, 14.

Figure 8:
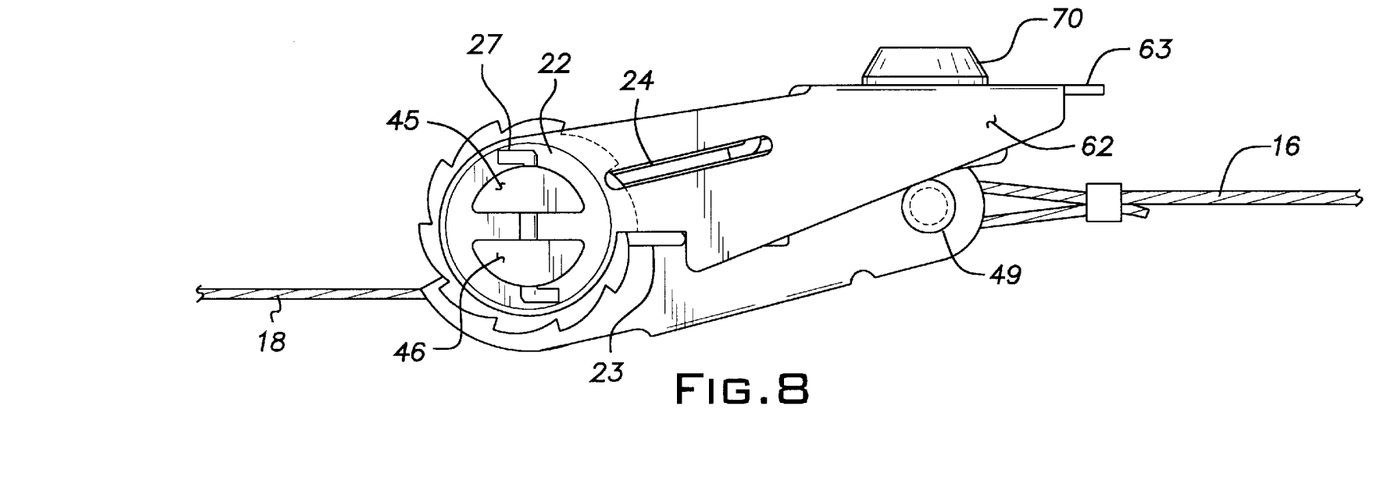
FIG. 8 is a side view of another embodiment of the tie-down assembly showing the use of a cable in place of a strap.

Referring now to FIG. 8, there is shown another conventional embodiment of locking ratchet assembly 20, which uses lashing cables 16, 18 in place of lashing straps 12, 14.

In operation, when the slack in variable length lashing strap section 12 is taken up on winding shaft 44, locking ratchet assembly 20 will be configured as shown in FIGS. 3, 4, and 8. The next step is to engage ratchet teeth 28 with frame pawl 23 and handle pawl 24. Upward movement of tensioning handle 60 from a second to a first position moves handle pawl 24 to cause simultaneous rotation of ratchet wheels 21, 22 and winding shaft 44. Rotation of winding shaft 44 further tightens variable length lashing strap section 12. Tensioning handle 60 can then be returned to the second position where the ratcheting cycle can be repeated. This ratcheting cycle is repeated until variable length lashing strap section 12 has achieved its desired tension. Once the desired tension has been achieved in variable length lashing strap section 12, tensioning handle 60 is returned to its second position and locked by turning key 76 in key slot 71. Turning of key 76 rotates male latch member 74 which prevents withdrawal of male latch member 74 from latch opening 81 in female latch member 77, and secures tensioning handle 60 to frame 40. This securement prevents further rotation of ratchet wheels 21, 22, and also prevents release of tension in variable length lashing strap section 12.

Figure 9:
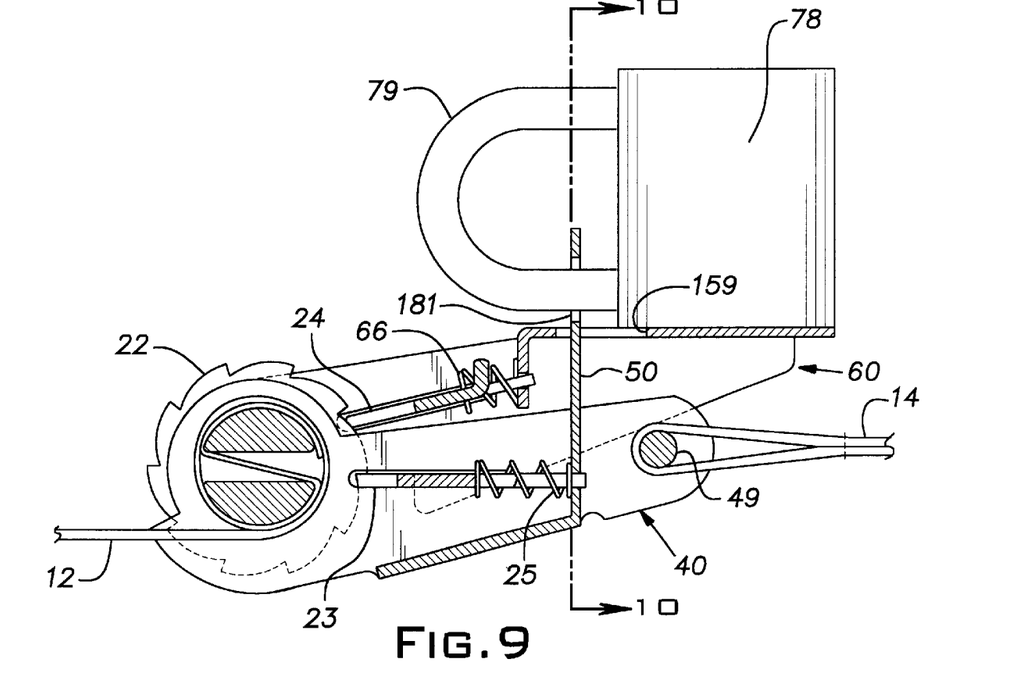
FIG. 9 is a side sectional view of another embodiment of the tie-down assembly showing an alternative embodiment of the invention; and, FIG. 10 is a front sectional view of the tie-down assembly in the second position of the alternative embodiment of the invention illustrated in FIG. 9.
Figure 10:
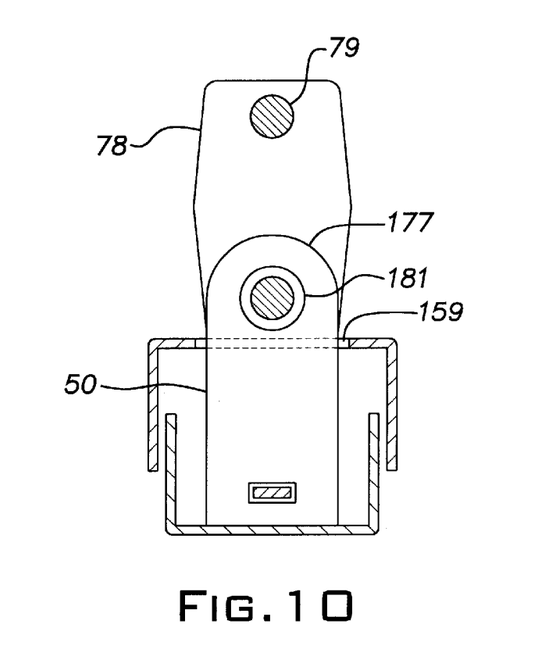

Referring now to FIGS. 9 and 10, an alternative embodiment of the key operated latch mechanism is shown from a side sectional view and a front sectional view. In this embodiment, frame 40 includes an L-shaped locking member portion 50 which protrudes through an opening 159 in tensioning handle 60 when tensioning handle 60 is in the second position. Locking member portion 50 contains a latch opening 181 in its top portion 177 which allows a locking bolt or a U-shaped locking member 79 of a standard padlock 78 to pass therethrough. In operation, once the desired tension has been achieved in variable length lashing strap section 12, tensioning handle 60 is returned to the second position as described above. When tensioning handle 60 is in the second position, U-shaped locking member 79 of a standard padlock 78 can be passed through latch opening 181 of locking member portion 50. Tensioning handle 60 can then be locked either with a combination lock or a key lock. Locking padlock 78 prevents disengagement of tensioning handle 60 from frame 40. This securement prevents further rotation of ratchet wheels 21, 22, and also prevents release of tension in variable length lashing strap section 12.

With reference to the alternative embodiment of the invention disclosed in FIGS. 9 and 10, it will be appreciated that the tie-down ratchet assemblies will in many situations be used alongside or in close proximity to identical tie-down assemblies. Having a multitude of tie-down assemblies located in close proximity to each other facilitates the use of a cable lock extending through a series of latch openings 181 in top portions 177 of locking member portion 50 to allow securement of several tie-down ratchet assemblies with one lock element.

The preferred and alternative embodiments of the invention discussed above are desired because each embodiment allows insertion of a positive, manually actuated lock with little modification to conventional structures used in a tensioning apparatus. In each embodiment, the frame of the tie-down apparatus is modified in a strengthening manner while the provision of an opening in the tensioning handle as described does not adversely affect the strength of the tensioning handle. Thus, a lock mechanism can be mounted to these sturdy elements of the tie-down assembly to provide a secure, non-yielding locking action. However, in accordance with the broader scope of the invention, different locking arrangements, other than those illustrated, may be employed.

For example, either handle side wall 61, 62 of tensioning handle 60 and mating frame side walls 41, 42 of frame 40 can be used to lock tensioning handle 60 to frame 40. Conceptually, holes can be provided in handle side wall adjacent frame side wall which align with one another when tensioning handle 60 is in its second position. Thus, when tensioning handle 60 is in the second position, a locking bolt can be inserted through the aligned holes.

Alternatively, a telescoping lock arrangement may be utilized, such as disclosed in assignee's well-known U.S. Pat. No. 4,738,127 to Johnson, issued Apr. 19, 1988. A serrated rod, such as shown in Johnson, can be mounted to pivotally extend from the base or center frame portion 43 of frame 40. The Johnson lock can be mounted in a handle opening similar to that discussed above. Alternatively, the Johnson lock can be mounted in lock opening 59 but in a position away from where the user grips tensioning handle 60. The rod telescopes through the Johnson lock as tensioning handle 60 is moved from its first to second position and second to first position. This arrangement allows positive locking of the handle at any position and without having to return the handle to its second position.

The invention has been described with reference to a preferred and alternative embodiments. It is believed that modifications and alterations to the embodiments disclosed will suggest themselves to those skilled in the art upon reading and understanding the detailed description set forth herein. It is intended to include all such modifications and alterations insofar as they come within the scope of the present invention.

Having thus described the invention, it is claimed:

1. A tie-down assembly for securing an article by a strap comprising:

a frame;

a winding shaft journaled for rotation in said frame in a first payout direction and in an opposite second take-up direction whereby the strap is wound around the winding shaft in the take-up direction, and unwound from the winding shaft in the payout direction;

a rachet wheel having ratchet teeth rotatable with the winding shaft;

a handle associated with the winding shaft and movable from a second to a first position for rotating the winding shaft an incremental angle in the take-up direction while not rotating the winding shaft when moved from the first to the second position;

a spring biased handle pawl engaging the ratchet teeth to allow rotation of the winding shaft by the handle in the take-up direction and prevent rotation in the payout direction, the spring biased handle pawl being movable out of engagement with the ratchet wheel to allow strap payout; and, a key operated latch mechanism for selectively locking the handle to the frame in the second position.

2. The tie-down assembly of claim 1, wherein said frame includes a U-shaped member having a frame center portion and frame side walls extending from said frame center portion; each frame side wall having a circular frame opening for receiving an end of said winding shaft and journaling said winding shaft in said circular frame opening; each frame side wall having a frame longitudinal slot and two additional circular openings; a lashing bar extending within the additional circular openings for fixing one end of said strap to said tie-down assembly.

3. The tie-down assembly of claim 2, wherein said handle includes a U-shaped member having a handle center portion and handle side walls extending from said handle center portion, each of said handle side walls having a circular handle opening for receiving said winding shaft rotatable therein, and each handle side wall having a handle longitudinal slot.

4. The tie-down assembly of claim 3, wherein said winding shaft includes a pair of spaced apart semi-circular winding shaft plates adapted to receive two opposite ends of said strap; a winding shaft washer at each end of said winding shaft outboard of said frame side walls and said handle side walls having a pair of semi-circular openings for receiving said winding shaft plates; a pair of ratchet wheels located between said frame side walls and said handle side walls; and a pin extending through said winding shaft plates at each end thereof outboard of said winding shaft washers.

5. The tie-down assembly of claim 4, wherein said frame includes a frame pawl extending through and moveable within said frame longitudinal slots and a frame spring biasing said frame pawl into engagement with a least one of said ratchet wheels allowing said winding shaft to move in said take-up direction and preventing movement in said payout direction; and said handle pawl extending through and movable within said handle longitudinal slots and a handle spring biasing said handle pawl into engagement with a least on of said ratchet wheels allowing rotation of said winding shaft in said take-up direction and preventing movement in said payout direction.

6. The tie-down assembly of claim 5, wherein said key operated latch mechanism includes said handle center portion having a lock opening therein; a female latch member connected to and straddling said frame side walls, said female latch member having a configured latch opening aligned with said lock opening when said handle is in said second position; a lock tumbler having a key slot, said lock tumbler being connected to said handle center portion and passing through said lock opening; and a rotatable male latch member attached to said lock tumbler and configured to pass through said latch opening when said lock tumbler is in an unlocked condition and the handle is in the second position and unable to pass through said latch opening when the lock tumbler is in a locked condition.

7. A retractable tie-down assembly for securing an article by a strap comprising;

a frame to which one end of the strap is immovably secured;

a winding shaft journaled for rotation in the frame and about which the strap is wound when the winding shaft is rotated in a take-up direction and unwound when the winding shaft is rotated in a payout direction;

a handle pivotally mounted to and manually rotatable relative to the frame between first and second positions;

engagement means for rotating the winding shaft in the take-up direction when the handle is moved from the second toward the first position while not rotating the winding shaft when the handle is moved from the first toward the second position; and, locking means actuated by a key to positively lock said handle to said frame when said handle is in the second position.

8. The retractable tie-down assembly of claim 7, wherein said frame has a frame center portion and spaced frame side walls extending therefrom; said locking means actuated by a key includes said handle having a handle center portion with a lock opening therethrough; a lock tumbler having a key slot connected to said handle center portion and through said lock opening; a female latch member connected to and straddling said frame side walls, said female latch member having a configured latch opening aligned with said lock opening when said handle is in said second position and a rotatable male latch member attached to said lock tumbler and configured to pass through said latch opening when said lock tumbler is in an unlocked condition and said handle is in said second position and unable to pass through said latch opening when said lock tumbler is in a locked condition.

9. The tie-down assembly of claim 1, wherein said frame is a U-shaped member having a frame center portion and frame side walls, said key operated latch mechanism includes a handle center portion having a lock opening therein; a female latch member connected to and straddling said frame side walls, said female latch member having a configured latch opening aligned with said lock opening when said handle is in said second position; a lock tumbler having a key slot, said lock tumbler being connected to said handle center portion and passing through said lock opening, and a rotatable male latch member attached to said lock tumbler and configured to pass through said latch opening when said lock tumbler is in an unlocked condition and said handle is in said second position and unable to pass through said latch opening when the lock tumbler is in a locked condition.

10. In a retractable tie-down assembly for securing an article by a strap having first and second ends, a frame to which the first end of the strap is immovably secured, a rotatable spindle journaled in the frame and about which the second end of the strap is wound, and a handle for rotating the spindle, the improvement comprising:

a lock to positively lock the handle to the frame such that the handle cannot be moved relative to the frame by unauthorized persons.

11. The retractable tie-down assembly of claim 10, further comprising said frame having a frame center portion and spaced frame side walls extending therefrom; said lock includes said handle having a handle center portion with a lock opening therethrough; a lock tumbler having a key slot connected to said handle center portion and through said lock opening; a female latch member connected to and straddling said frame side walls; said female latch member having a configured latch opening aligned with said lock opening when said handle is in a second position and a rotatable male latch member attached to said lock tumbler and configured to pass through said latch opening when the lock tumbler is in an unlocked condition and said handle is in said second position and unable to pass through said latch opening when said lock tumbler is in a locked condition.

* * * * *